US011226493B2

(12) United States Patent
Joseph et al.

(10) Patent No.: US 11,226,493 B2
(45) Date of Patent: Jan. 18, 2022

(54) DISPLAY SYSTEM FOR PRODUCING DAYLIGHT-VISIBLE HOLOGRAPHIC OR FLOATING 3D IMAGERY

(71) Applicant: DISNEY ENTERPRISES, INC., Burbank, CA (US)

(72) Inventors: Daniel M. Joseph, Windermere, FL (US); Jessica Anne Klouda, Kissimmee, FL (US); Donald Leo Matz, Ocoee, FL (US); Jacob A. Ellis, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 274 days.

(21) Appl. No.: 16/371,266

(22) Filed: Apr. 1, 2019

(65) Prior Publication Data

US 2020/0310143 A1    Oct. 1, 2020

(51) Int. Cl.
*G02B 30/56* (2020.01)
*G02B 30/26* (2020.01)

(52) U.S. Cl.
CPC ............. *G02B 30/56* (2020.01); *G02B 30/26* (2020.01)

(58) Field of Classification Search
CPC ................................ G02B 30/56; G02B 30/26
See application file for complete search history.

(56) References Cited

U.S. PATENT DOCUMENTS

| 2012/0081524 | A1* | 4/2012 | Joseph | H04N 13/346 348/51 |
| 2014/0049536 | A1* | 2/2014 | Neuman | H04N 13/239 345/419 |
| 2016/0360167 | A1* | 12/2016 | Mitchell | H04N 9/3194 |
| 2018/0017940 | A1* | 1/2018 | Smithwick | G03B 21/56 |

* cited by examiner

*Primary Examiner* — Jade R Chwasz
(74) *Attorney, Agent, or Firm* — Snell & Wilmer L.L.P.; Kent A. Lembke

(57) ABSTRACT

A system for displaying three dimensional (3D) images. The system includes a 3D display operating in a first state to display a 3D image by outputting light into a viewing space and operating in a second state in which the 3D image is not displayed. The system further includes a screen element positioned between the 3D display and the viewing space. The screen element reflects light from the viewing space to appear opaque to a viewer in the viewing space when the 3D display operates in the second state. The screen element transmits the light output by the 3D display, whereby the 3D display image is perceivable by the viewer in the viewing space. The screen element includes a sheet of mesh or netting material that transmits light output by the 3D display through its pores or openings and may be a planar sheet of scrim, tulle, or chiffon.

14 Claims, 10 Drawing Sheets

DISPLAY SYSTEM FOR PRODUCING DAYLIGHT-VISIBLE HOLOGRAPHIC OR FLOATING 3D IMAGERY

BACKGROUND

1. Field of the Description

The present description relates, in general, to devices and methods for providing a three-dimensional (3D) display including, in many cases, in a glasses-free manner. More particularly, the description relates to a 3D display system adapted for creating holographic type or floating 3D images (left and right eye images) viewable to one or more viewers' eyes often without the need for the viewer to use special glasses, headgear, or filters (e.g., glasses-free 3D or autostereoscopic) as the viewers are free to move all around the display such that it functions in some embodiments as a 360-degree autostereoscopic display system.

2. Relevant Background

Displays that provide the illusion of three dimensions have experienced a rebirth in the past few years. For example, a number of 3D televisions are now available for use in homes and home theaters. These 3D televisions generally operate by displaying a stream of left and right eye images in an alternating or time-multiplexed manner (e.g., left-right-left-right). Switching occurs so quickly that the viewer does not sense a flicker or change in the display. The viewer often wears special headgear or glasses that operate in a synchronized manner with the display to only allow the light associated with the left eye image to reach the viewer's left eye and with the right eye image to reach the viewer's right eye.

While most commercial displays rely on the use of special glasses (or are stereoscopic displays), it is generally agreed by those in the 3D entertainment industry that displays able to provide a 3D viewing experience without glasses or headgear offer significant advantages. Autostereoscopy is any method of displaying stereoscopic images (i.e., adding binocular perception of 3D depth) without the use of special glasses or headgear on the part of the viewer. Many autostereoscopic or glasses-free 3D displays have been developed using a variety of technologies including lenticular lenses on the display screen combined with interlaced content, screens configured as parallax barriers, volumetric displays, and holographic and light field displays. However, each display technology has to date been proven to have limitations that have limited their widespread adoption.

For example, 3D televisions have been configured as lenticular autostereoscopic displays. The 3D lenticular television is mounted vertically on a wall or on a support base, and a viewer has multiple view images directed toward their eyes through a plurality of lenticules (or elongated lenses) that extend vertically upward or in a slanted manner upward on the outer surface of the display monitor. The 3D lenticular television may provide 1920 by 1200 pixels that are used to display an 8-view autostereoscopic image through the lenticules (or lens array or lenticular sheet). To this end, the image content (or digital image file) is interdigitated or interlaced as a number of slices (e.g., 8 slices in this example) of images that include multiple view images to provide the 3D effect, and the set of interlaced slices are displayed and repeated under each lenticule. These 3D televisions have a number of drawbacks in practice. For example, the viewer typically has to remain in a particular location relative to the front surface (lenticular sheet) of the display/monitor such as directly in front of the display/monitor and with their head (and left and right eyes) at a predefined height (e.g., a height matching the center of the display/monitor). The lenticular 3D television only provides views horizontally so if the viewer is at too great of a height (or too low of a height) the 3D image is viewed from an incorrect perspective, resulting in a distorted image that appears in an undesirable or unrealistic manner.

Additionally, it is desirable to provide eye-catching and entertaining information and imagery along well-traveled spaces that are often defined by walls. In the past, standard printed signage has been used and is ubiquitous and always present such that it is often ignored or considered non-entertaining or attention grabbing by viewers. Another option tried by many facility operators is to add a monitor on the wall to add some dynamic elements, but the use of monitors has also recently become ubiquitous as everyone now seems to have too many screens in their daily lives. It may be desirable to use 3D animated characters to grab viewers' attention, but 3D televisions often cannot presently be used as the 3D imagery they produce can be difficult to see in more brightly lit spaces, such as in restaurants or near outdoor waiting areas often found in amusement parks and near other attractions, or the produced imagery does not seem to realistically "pop up (or out)" to viewers. Further, there are many applications where it is desirable to provide holographic game displays as often are provided in live action and animated movies. Conventional, 3D televisions are generally not useful in providing a tabletop or other holographic game display that can be viewed from two-to-four sides to provide interaction with a 3D floating or holographic-type image.

Hence, there remains a need for a new design for 3D display systems including those that utilize autostereoscopic displays or display devices. In some cases, it is preferable that the produced 3D imagery is viewable even in an outdoor environment and/or to "pop up" to viewers from walls and other surfaces in an area and, in some instances, to occupy the same space as the viewers and interact with them. Preferably, in some embodiments, this new design will allow a viewer or user of the display to move freely around the entire periphery of the display to provide a 360-degree display.

SUMMARY

A system is provided for displaying three dimensional (3D) floating or hologram images to viewers. In brief, the system includes a 3D display operating in a first state to display a 3D image by outputting light into a viewing space and operating in a second state in which the 3D image is not displayed (e.g., no or minimal light is output in the second or "effect off" state). The system further includes a screen element positioned between the 3D display and the viewing space. The screen element is designed or configured to reflect light from the viewing space so as to appear opaque to a viewer in the viewing space when the 3D display operates in the second state. Further, the screen element is designed or configured to transmit at least a portion of the light output by the 3D display when the 3D display operates in the first state, whereby the 3D display image is perceivable by the viewer in the viewing space at a distance apart from the screen element.

In some preferred embodiments, the screen element includes a sheet (or layer) of mesh or netting material, and the sheet of mesh or woven netting material transmits the at least a portion of the light output by the 3D display through pores or openings in the mesh or netting material. In some cases, the sheet of mesh or netting material is a planar sheet of scrim or tulle (e.g., a digitally printed scrim or the like). The screen element may further include a panel or pane of rigid transparent material (such as glass), and the sheet of mesh or woven netting material is mated to a surface of the panel or pane of transparent material (e.g., to an inner surface so as to be protected from damage and hidden from ready discovery by viewers).

In some system implementations, the 3D display is a stereoscopic device such as an autostereoscopic display device. In some particular implementations, an autostereoscopic display device in the form of a 3D television is used such as a lenticular-based television, and a display screen of the 3D television is positioned to be facing the screen element. The 3D display may then further include a controller and a media server, with the controller operating the media server to serve media to the 3D television during the first operating state and with the media including a colored 3D component and a black background in areas unused by the colored 3D component.

DETAILED DESCRIPTION

Figure 1:
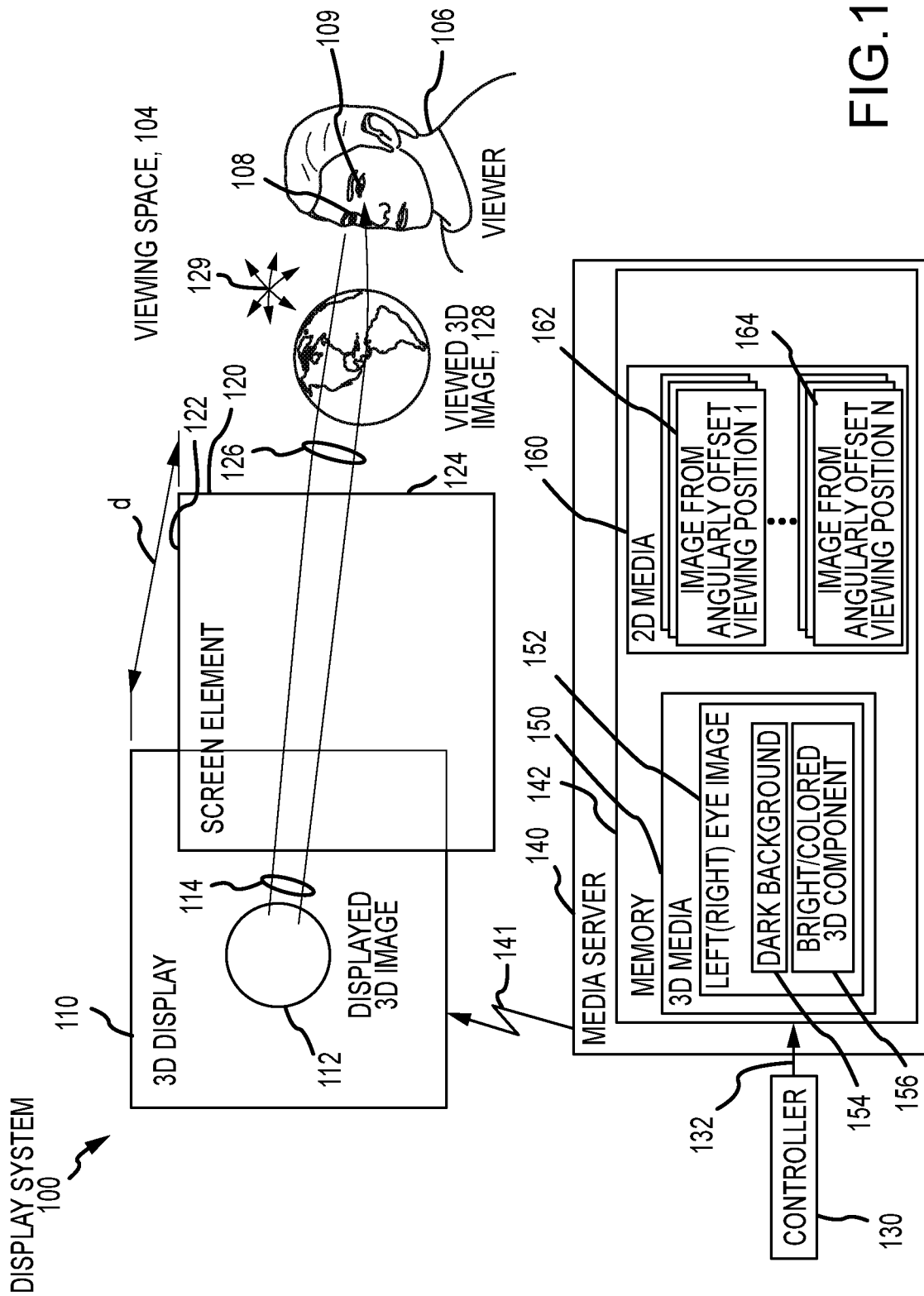
FIG. 1 illustrates a functional block diagram of a display system of the present description.

Briefly, a display system is described that is particularly useful in displaying 3D floating or holographic images that may be viewed by and interacted with by viewers even in more brightly illuminated settings. For example, the display system may be configured to provide a wall panel-type display in which a 3D image seems to "pop" out of into the viewer's nearby space. In another example, the display system is configured to provide a touchable holographic display such as a tabletop type display that provides a floating 3D image that is viewable from 360 degrees as the viewer moves about the periphery of the tabletop display.

Generally, the display system includes a stereoscopic or 3D display that is positioned behind a screen element. The 3D display, in some embodiments, is an autostereoscopic display such that the viewer does not need to wear special 3D glasses or eyewear as the displayed 3D image is made up of switching left and right eye images delivered to the viewer's left and right eyes. The screen element is chosen to appear to the viewer to be opaque when the 3D display is not displaying the 3D image (e.g., is reflective of ambient light from its front or outer surface facing the viewer/viewing space) but allow viewing the 3D image when its is displayed by the 3D display (e.g., is transmissive to light from the 3D display). To this end, the screen element may include a sheet of mesh fabric or loosely woven netting such as a sheet of theatrical scrim, tulle, or the like. In this manner, the 3D display is hidden from view when not operating to provide the 3D imagery and also is at least partially hidden from view when it is operating to provide the 3D imagery with the light associated with the 3D imagery (i.e., left and right eye images) passing through the screen element to form a viewable/viewed 3D image that appears to the viewer to float some distance apart from the front or outer surface of the screen element.

In one wall panel-type embodiment, a display system is provided in which the screen element is formed of a printed chiffon scrim panel that is laminated (or otherwise mated with or attached to) to a surface/side (e.g., the back or inner surface/side to protect the scrim material from damage) of a layer or pane of transparent material (e.g., a plastic, glass, or the like). The 3D display is positioned behind the screen element and may take a variety of forms with one preferred embodiment using an autostereoscopic display such as, but not limited to, an autostereoscopic lenticular display or 3D television.

The 3D imagery on the autostereoscopic lenticular display is created specifically for use with the particular screen element or for this particular illusion. For example, the 3D media created has in each frame (e.g., each displayed left eye and right eye frame or image) has a dark (e.g., a dark color such as black) background and a bright 3D component (e.g., a full color object) that is viewed as the "floating element." Because the portions of the lenticular display or 3D television screen/monitor that are not used to display the 3D image provide a black (or other dark color) background, these background or unused areas do not shine through the screen element. Only the bright or colorful portions associated with the displayed 3D image shine through the screen element. This allows the display or television screen to be hidden or at least disguised from view behind the screen element (e.g., behind the scrim or other mesh/netting material).

In use, the screen element (or scrim in many cases) can have its front or outer surface digitally printed such that it blends into adjacent wall/panel surfaces to look like a ubiquitous wall with texture when the 3D display is not in display operations/mode but yet have 3D imagery (or media) displayed on the display screen of lenticular display or 3D television (positioned behind the screen element and facing its back or inner surface) "float" some distance from the front or outer surface of the screen element (e.g., out into the viewing space adjacent the wall/panel in which the screen element is integrated). Because many 3D displays can be made to be high brightness or to be sunlight visible, the 3D effect created by the new display system can even shine through the screen element in an outdoor or other brightly illuminated environment.

The new display system can be formed to have a small footprint (e.g., a large depth is not required so can fit into most conventional walls) and can be fabricated at a relatively low cost due to the use of commercially available subcomponents. The display system can very simply be scaled from small to large. For example, a wall scrim panel on glass or plastic is a low cost item to create, and then putting a 32-inch to 100-inch or larger autostereoscopic display behind the wall scrim panel allows easy fabrication of the new display system. Another useful feature of this embodiment of the display system is its low facility impact as it can be installed in very cramped wall space such as with only a few inches of depth needed. Once installed, it appears to the observer as a standard wall until the 3D display system (or the effect) is turned on.

In another implementation of the display system, a touchable holographic display is provided that is 360-degree playable by viewers. The display system can be scaled from very large down to being small enough to be provided as a toy or other consumer product (e.g., a desktop display, a handheld device, or the like). The display system creates an illusion of a four-sided or single-sided hologram, which a viewer can view close up or at a distance and even put their hand through the floating image or hologram.

In brief, the display system uses four high brightness liquid crystal displays (LCDs) in its 3D display, and each LCD is paired with a quarter sphere reflector (e.g., a black plastic (or other material) reflector). Each LCD outputs a two-dimensional (2D) image that appears to be 3D when it is reflected off the quarter sphere reflector, and the four reflectors are arranged at angular offsets (e.g., 90 degrees when four reflectors are used), with their back/outer surfaces facing each other and a center of the 3D display. A screen element (e.g., a scrim laminated onto a transparent panel) is placed over the four reflectors such that light from the LCDs is concurrently reflected through the scrim (and allowing the 3D display to be hidden by the "opaque" screen element when not operated to display images). The LCD light would be reflected up in a tabletop-type arrangement, and, when a viewer looks at the tabletop surface provided by the screen element, the display system gives the illusion a still or (more typically) video image is floating above it some distance.

This embodiment of the display system is also extremely scalable due to its design. The reflector may be thought of as performing much of the magic of the illusion and can be formed out of inexpensive black plastic (e.g., clear plastic painted black, black plastic that is formed into a quarter sphere, or the like). The reflector may be formed in many sizes (e.g., from a sphere of a wide range of inner diameters). In some embodiments, a micro louver sheet is disposed between the reflectors and the screen element so that the display system was four-sided and could be "played" in the round (or 360 degrees) by the viewer. The micro louver allows the viewer to look down (in a tabletop arrangement) through the screen element into one of the four reflectors without the presence of the other reflectors and their paired 2D display being given away/being visible to the viewer (e.g., micro louver blocks view of 2D display located directly across from the viewer as they view light reflected from the proximate reflector in the 3D display). The low cost of the each of the subcomponents of the display system makes the display system attractive over many other techniques of creating a holographic or 3D effect as these often require very expensive optical elements to be effective.

FIG. 1 illustrates a functional block diagram of a display system 100 of the present description that can be used to implement the two designs described above. The system 100 includes a viewing space 104 in which one or more viewers such as viewer 106 may be located and be provided, by operation of the system 100, a 3D illusion or effect. To this end, the system 100 includes a 3D display 110 (e.g., a stereoscopic device, an autostereoscopic device such as a 3D television, an assembly of 2D displays each paired with quarter sphere reflectors, or the like) that is operable to provide or display a displayed 3D image 112 (e.g., an animated 3D video or the like).

The system 100 further includes a screen element 120 disposed between the 3D display 110 (e.g., sized to fully cover the 3D display 110 or at least its output portion) and the viewing space 104 and viewer 106. The screen element 120 may include a sheet or panel of mesh fabric or woven netting so that it appears opaque to the viewer 106 when the 3D display is "off" or not outputting the displayed 3D image 112, e.g., an outer or front surface 124 of the screen element 120 is reflective of ambient light in the viewing space 104. Further, the screen element 120 is at least partially transmissive of light 114 associated with the displayed 3D image 112 such that a portion 126 of this light 114 striking the inner or back surface 122 of the screen element 120 passes through the screen element 120 to be received by the viewer's right and left eyes 108, 109 (which are not covered with 3D eyewear/glasses in this example in which the 3D display 110 may be an autostereoscopic device but other embodiments of system 100 may use a stereoscopic device and the viewer 106 would then wear eyewear suited for the 3D display 110).

As shown, the light 126 reaching the eyes 108, 109 of the viewer 106 causes them to perceive a viewed 3D or floating image 128 in the viewing space 104 apparently some distance from the outer or front surface 124 of the screen element 120. The image 128 may be a still image or as shown with arrows 129 may be an animated image 128 (e.g., the display 3D image may be a 3D video made up of switching left and right eye images associated with many frames of 3D media). The inner or back surface 122 may be spaced apart a distance, d, from a top or display surface (e.g., a display screen of a 3D television, a plane extending through upper edges of a set of quarter sphere reflectors, and the like) of the 3D display 110 such as in the range of 0 to 12 inches or more to achieve a desired 3D illusion/effect with the system 100.

In some embodiments, a wall (or table top or horizontal upper surface) is also included in the system 100, and the screen element 120 may be joined to or supported by the wall (or table top) to have its outer surface coplanar with the wall (or table top). Further, the screen element 120 may include a scrim (e.g., a theatrical chiffon scrim (e.g., Rose Brand® scrim or the like) or other mesh/netting fabric (such as tulle) that can have its outer surface digitally or otherwise printed to match or blend with the outer surface of the nearby wall (or table top) so that it may be wholly or nearly unnoticeable by the viewer 106 in the viewing space 104.

The system 100 is also shown to include a controller 130 that is operable to provide control signals (and/or power) 132 to a media server 140. The server 140 is included in the system 100 to selectively provide media streams as shown at 141 to the 3D display 110 to operate or enable it to provide the displayed 3D image 112. Particularly, the server 140 is shown to include memory 142 for storing 3D media 150 for use in the stereoscopic (which includes autostereoscopic) embodiments of the 3D display 110 and for storing 2D media 160 for use in the quarter sphere reflector embodiments of the 3D display 110.

With a stereoscopic 3D display 110, the media server 140 is operated by the controller 130 to provide 3D media 150 to the 3D display 110 (as shown with arrow 141 providing a wired or wireless connection). The 3D media 150 includes left (and alternating right) eye images (or frames) 152. Each of these is specially configured for better hiding the 3D display 110 behind the screen element 120 by including a dark background 154 that may be all colored black that is associated with unused portions of the display 110 (e.g., of a display screen of a 3D television). Further, each image 152 typically includes a 3D component 156 that is provided with full color (e.g., any color other than black but often brighter colors for a cleaner or pop-producing 3D image 128). In this way, the background or black portions of the displayed 3D image 112 are not readily viewable or perceivable by the viewer 106 as part of the viewed 3D image 128, which hides the presence of the 3D display 110 (by avoiding having the 3D component at the outer edges of its display screen/monitor for example) behind the reflective surface 124 of the screen element 120.

With a quarter sphere reflector 3D display 110, the media server 140 is operated by the controller 130 to provide 2D media 160 to the 3D display 110 as shown with arrow 141. The 2D media 160 includes media that is unique to each of the 2D displays (e.g., LCDs or the like) depending on which quarter sphere reflector they are paired with in the 3D display 110. In this way, a differing view of a "3D" or floating hologram image 128 is visible through the screen element 120 via each of the reflectors at a different viewing position relative to the 3D display such as from a side of rectangular table top-type display (with screen element 120 provided at or near the upper surface of the table top) or in 90-degree viewing windows about the periphery of the 3D display 110 in the viewing space 104 as the viewer 106 moves around the 3D display 110. In this regard, the 2D media 160 includes a plurality of frames or images from a first angularly offset viewing position 162 as well as from each other viewing position as shown at 164 (with "N" being the number of viewing positions from 1 to 4 (or more), with an embodiment discussed below including four reflectors each paired with a dedicated 2D display playing media 162, 164 designed for this reflector/2D display combination (e.g., to display a side for viewed 3D image 128 to viewer 106)).

Figure 2A:
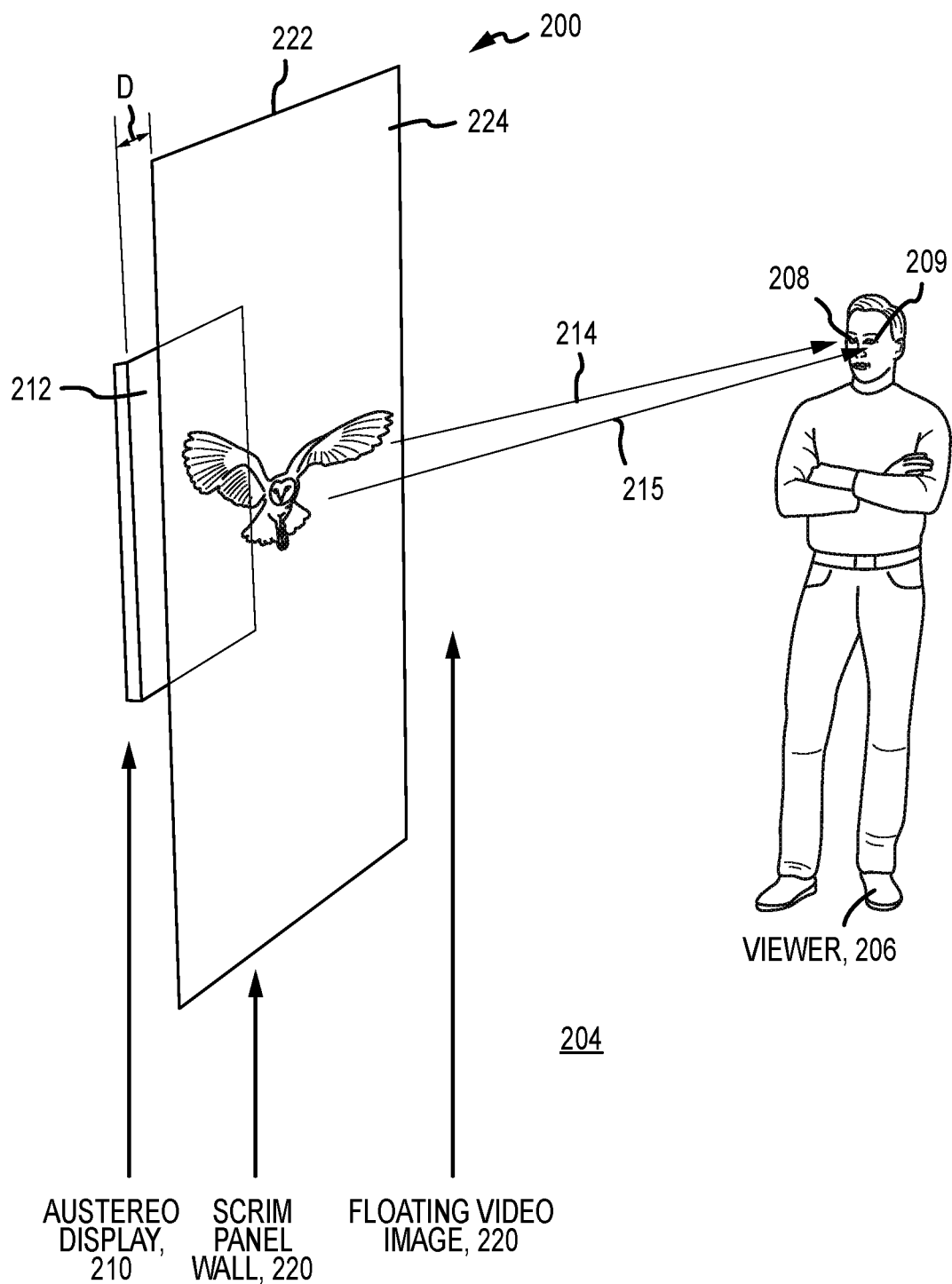
FIGS. 2A and 2B illustrate an autostereoscopic 3D display-based display system of the present description during operating (3D image displaying) mode and non-operating (or "off") mode, respectively.
Figure 2B:
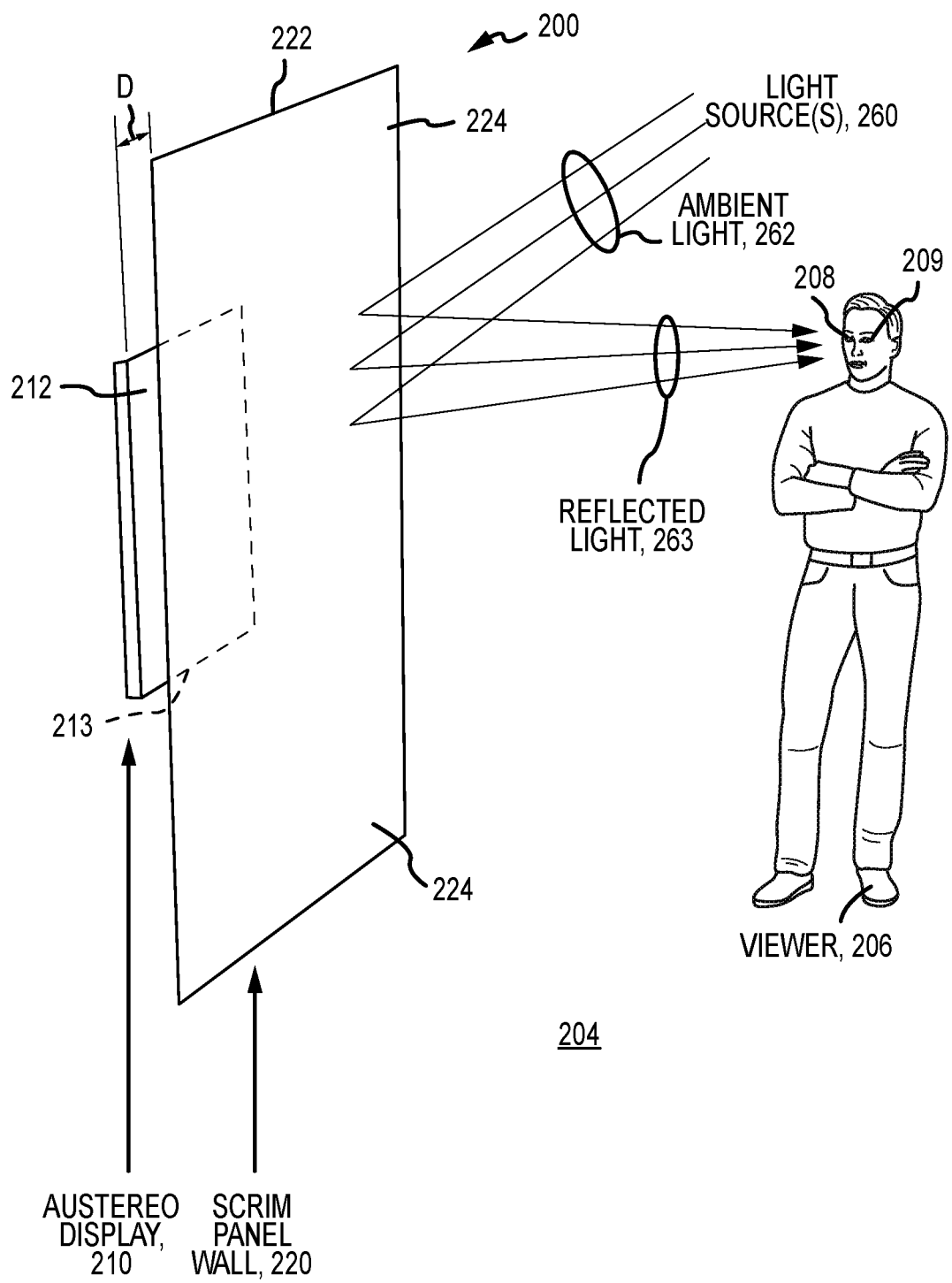

FIGS. 2A and 2B illustrate an autostereoscopic 3D display-based display system 200 of the present description during operating (3D image displaying) mode and non-operating (or "off") mode, respectively. The system 200 provides one useful implementation of the system 100 of FIG. 1 in which the 3D display 110 is provided in the form of an autostereoscopic display 210 such as a 3D television (with one prototype using a 3D television including lenticular lenses on its display screen/surface 212 and using media in the form of interlaced content (e.g., with 4 to 9 or more views provided by shooting an animated image/scene from 4 to 9 differing views) to provide the black background/unused areas and full color 3D components as discussed with reference to FIG. 1). The autostereoscopic display 210 includes a display surface 212 that as shown in FIG. 2A is operated to provide/display a displayed 3D image, which may take the form of a black background (or unused) portion combined with a full color (or bright) 3D component. The system 200 further includes a screen element in the form of a scrim panel wall 220 with an inner or back surface 222 facing the display screen 212 of the autostereoscopic display 210 and spaced apart from (and typically parallel with) the display screen 212 by a distance, d (e.g., in the range of 0 to 12 inches or more).

During the operating or image display mode of FIG. 2A, the display 210 produces light 214, 215 associated with the displayed 3D image and providing right and left eye images that are received by a right eye 208 and left eye 209, respectively, of a viewer 206 in a viewing space 204. The scrim panel wall 220 has an outer or front surface 224 facing away from the display 210 and toward the viewing space 204. The scrim panel wall 220 includes a scrim that may be a chiffon scrim (e.g., a scrim distributed under Rose Brand® or the like), and this scrim may have its outer surface 224 digitally printed to have a texture, pattern, and/or color matching or suited to adjacent surfaces such as of surfaces of a wall upon which the scrim panel wall 220 is mounted. In some cases, the scrim panel wall 220 includes a transparent pane (e.g., a plastic, glass, or other transparent material sheet) and the chiffon scrim is laminated or otherwise attached onto an inner (or outer) surface of this transparent pane. The scrim panel wall 220 typically is planar and arranged to be parallel to the display screen 212.

The chiffon scrim (e.g., scrim used in theatrical settings, bus wrap material, other mesh or woven netting fabric sheet or layer, tulle, or the like) is chosen to transmit a relatively large fraction (e.g., 30 to 70 percent) of the light 214, 215 output from the display screen 212 that strikes the back or inner surface 222 so that it is passed through the panel 220 into the viewing space 204 to allow the viewer 206 to perceive a floating 3D image 250 (e.g., a 3D video image made up of left and right eye images). The floating 3D image 250 appears to be located some distance from the outer or front surface 224 of the scrim panel wall 220, and it will be appreciated by those skilled in the art that the inclusion of the scrim of the scrim panel wall/screen element 220 adds depth as it hides the display screen 212 while providing a reference surface 224 that assists the viewer 206 in processing the right and left eye images/light 214, 215 reaching their right and left eyes 208, 209 into a realistic and sharp 3D image 250. The autostereoscopic display 210 may be chosen to be bright enough to be daylight visible and to provide a black screen in areas/pixels not used to display the 3D component. Holes in the scrim give a straight shot for light from the display screen 212 (or light emanating from its lenticules or the like)

In FIG. 2B, a controller (not shown but found in display system 100 of FIG. 1) turns the display 210 "off" or halts its display of 3D media on display screen 212. During this non-displaying or off mode, the scrim panel wall 220 acts to disguise or hide the presence of the display screen 212 behind it to the viewer 206. Particularly, the scrim panel wall 220 (or its scrim sheet) acts to reflect ambient light 262 from one or more light sources 250 (e.g., the Sun if space 204 is outdoors, lighting in space 204, and so on) that strike the outer or front surface 224. The reflected light 263 reaches the viewer's eyes 208, 209 causing the viewer 206 to wholly or mainly perceive the surface 224 as being opaque, which blocks edges 213 (shown dashed to be hidden from view) of the display screen 213, and the effect can be enhanced by limiting or eliminating light sources behind the scrim panel wall 220 (or limiting the amount of light 262 directed toward the surface 212 through the scrim panel wall 220 to avoid/limit reflections from the surface 212).

Figure 3:
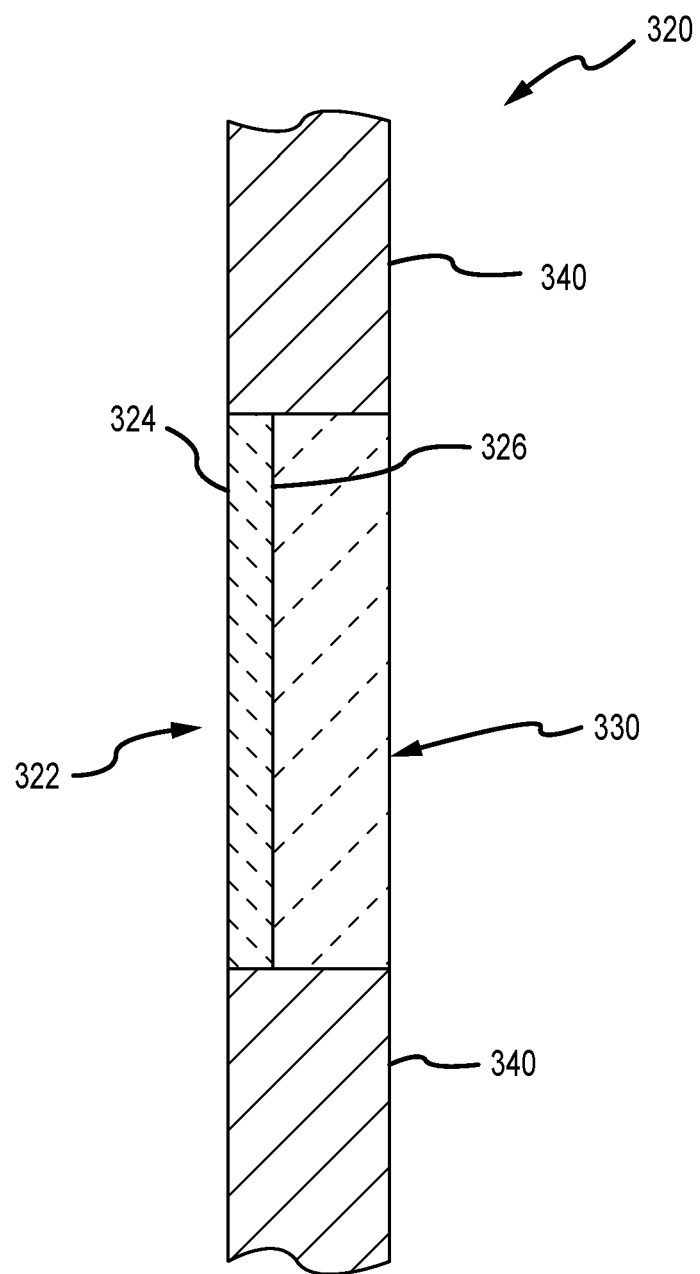
FIG. 3 illustrates a side sectional view of a scrim wall panel that may be used in the display system of FIGS. 2A and 2B.

FIG. 3 illustrates a side sectional view of a scrim wall panel 320 that may be used in the system 200 of FIGS. 2A and 2B. As shown, the panel 320 includes a screen element in the form of a scrim (or other mesh or netting material) sheet or layer 322 with an inner or back surface 324 and an outer or front surface 326. In use, the inner surface 324 would be positioned to face a 3D display while the outer surface 326 would be positioned to face outward toward a viewing space. The scrim sheet or layer 322 is attached (e.g., laminated) to an inner surface of a pane/sheet 330 of transparent (which means at least translucent to highly transparent to light) material such as a glass, plastic, or the like. The scrim 322 and pane/sheet 330 are disposed between (or within) sections 340 of a wall or panel, which often will be structural in nature and be opaque to light and which will physically support the scrim 322 and pane/sheet 330 (or screen element). The outer surface 326 of the scrim 322 may be digitally printed to have a pattern or color similar to that of the nearby surfaces of the wall/panel sections 340.

In another implementation, a display system is configured as a touchable holographic display that is 360-degree playable by viewers, and these implementations of display systems may be configured as tabletop displays in some cases. These display systems differ from those of FIGS. 1-3 in their use of a different embodiment of a 3D display to provide a floating or holographic image above (or spaced apart from) the screen element (which, again, utilize a mesh fabric or woven netting sheet such as a scrim).

Figure 4:
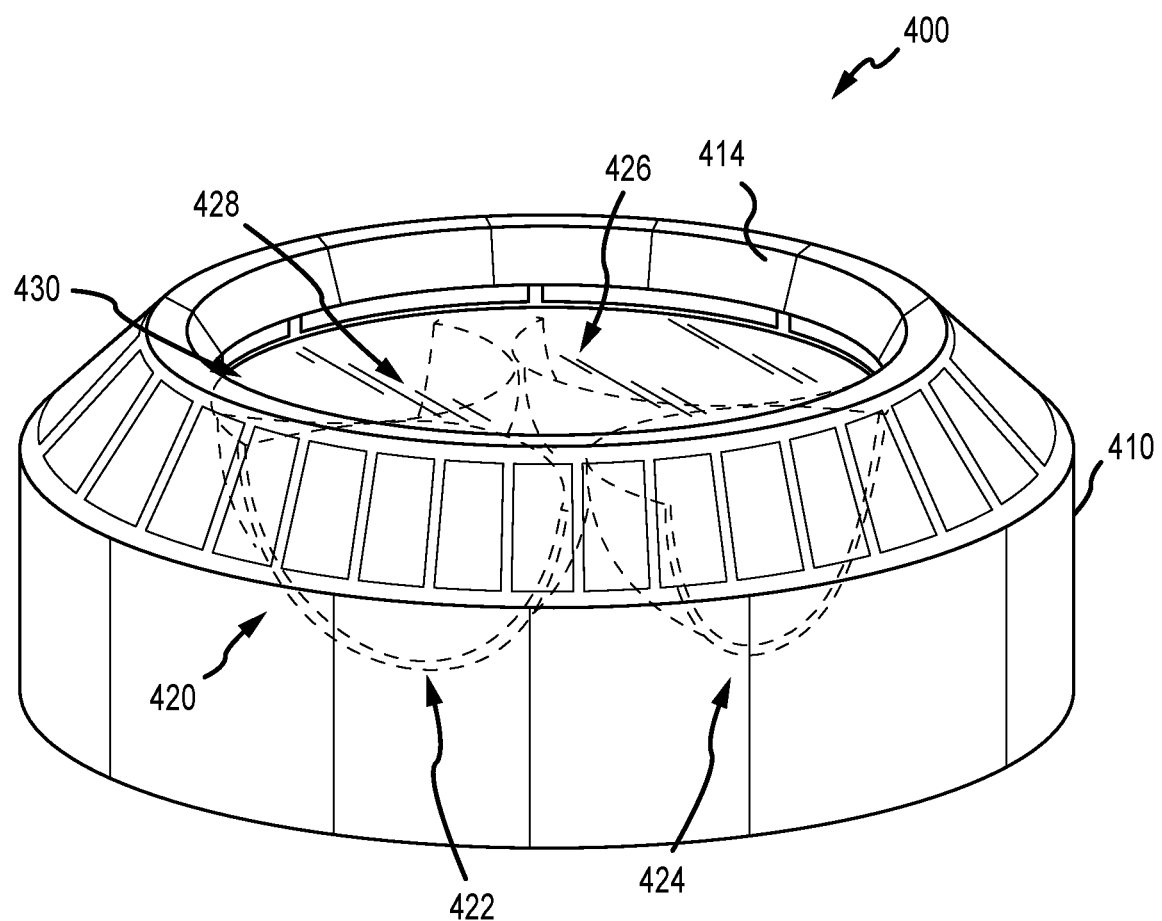
FIG. 4 illustrates a top, side perspective view of a display system of the present description implementing a 3D display using four quarter sphere reflectors along with a screen element.

FIG. 4 illustrates a top, side perspective view of a holographic tabletop display system 400 that implements the concepts described herein. Particularly, the system 400 includes a tabletop support or enclosure 410 that, in this non-limiting example, takes the form of a futuristic control or communications panel. The support/enclosure 410 is configured and used to physically support and house a 3D display 420 in an interior and, here, lower space. Further, the support/enclosure 410 physically supports a screen element 430 that is positioned to cover the 3D display 420 and to be disposed between the 3D display 420 and the exterior of the enclosure/support 410, i.e., the viewing space for the system 400. The enclosure/support 410 includes a viewing window or portal 414 into its interior space where the 3D display 420 is positioned, and the screen element 430 is positioned within the viewing window or portal 414, with its planar components orthogonal to the central axis of the viewing window or portal 414 and the 3D display 420.

As in other embodiments, the screen element 430 may take the form of a sheet of mesh or woven netting material such as a scrim, tulle, or the like that is attached to (e.g., laminated to) a surface (e.g., the inner surface for protection from damage from touching and to hide its presence in the system 400) of a transparent panel/pane (e.g., a glass, plastic, or other material sheet). The screen element 430, thus, appears opaque when the 3D display 420 is not operating to display a floating image or hologram or is not outputting light from the interior space of the enclosure/support 410, but the screen element 430 with its pores/holes provides a direct path for a large percentage of the light output by the 3D display 420 when the effect is turned on or when it outputs light to display a floating image or hologram. The screen element 430 (i.e., its sheet of scrim or the like) also acts, as discussed above, to provide a reference plane for a viewer's eyes to process the imagery and to locate the imagery relative to and spaced apart from the screen element 430 (rather than from the 3D display components). As shown, the scrim or other mesh/netting material layer or sheet of the screen element 430 may have a pattern, which may be digitally printed or otherwise formed, that can be chosen to suit the enclosure/support 410 or nearby surfaces and acts to further disguise the presence of the 3D display 420 behind or underneath the screen element 430.

The 3D display 420 is shown partially in FIG. 4 with the enclosure walls being semitransparent for illustration purposes only as these would typically be opaque in practice to hide the components of the 3D display 420. As can be seen, though, the 3D display 420 makes use of one or more quarter sphere reflectors that would each be paired with a 2D display (not shown in FIG. 4) to reflect light from the display screen of the 2D display up (or outward) through the screen element 430. In this example, the 3D display 420 includes four quarter sphere reflectors 422, 424, 426, and 428 arranged with their reflective inner surfaces facing outward away from a central axis of the 3D display 420 and the screen element 430. Each of the reflectors 422, 424, 426, 428 may be thought of as being arranged at 90-degree offsets from each other or neighboring ones of the reflectors 422, 424, 426, 428 about the central axis, and this creates 90-degree viewing angles or stations in the viewing space about the periphery of the enclosure/support 410 so viewers can move about the entire periphery of the enclosure/support 410 and perceive a 360-degree floating image or hologram.

Figure 5:
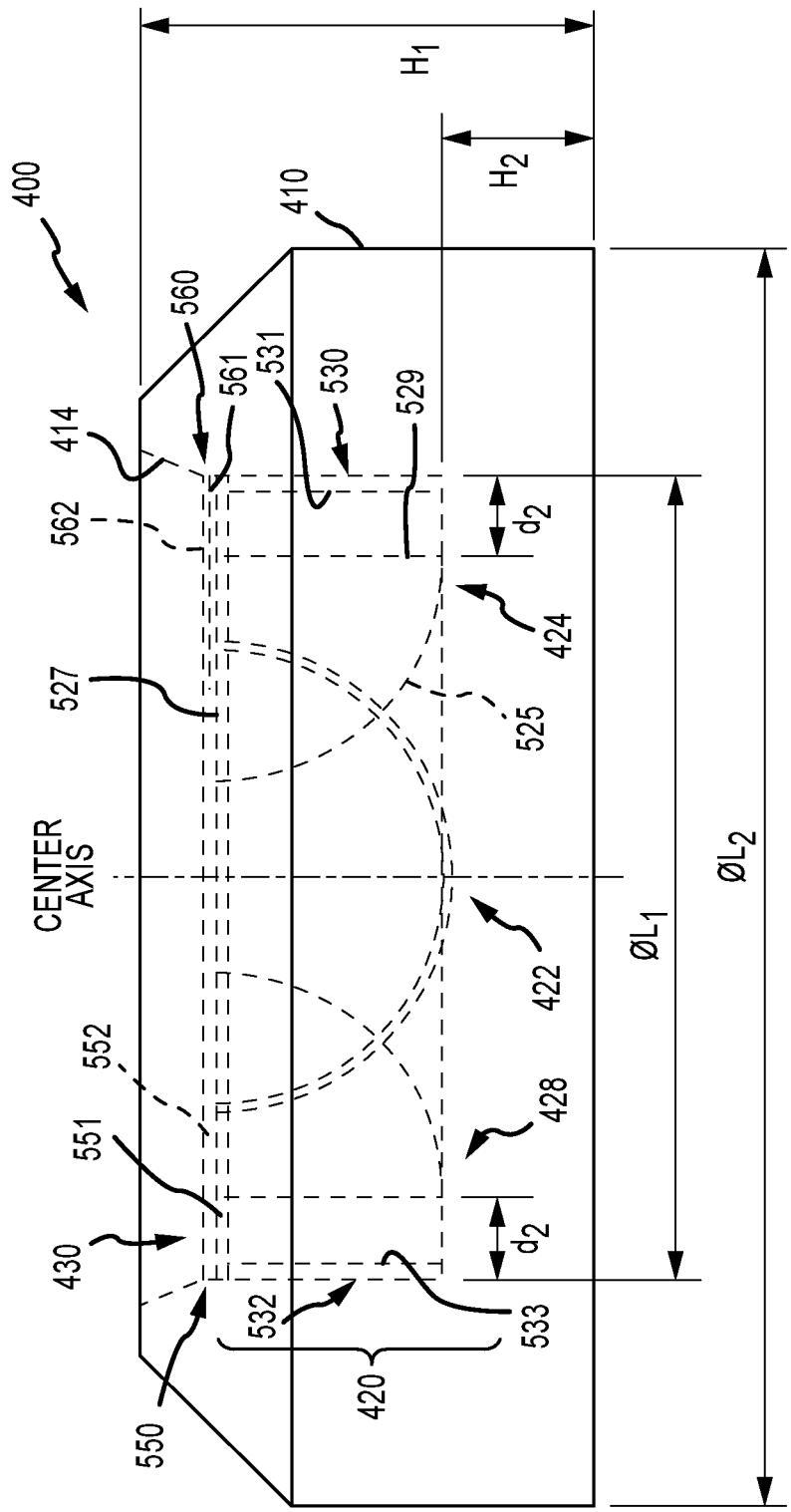
FIG. 5 is a side view of the display system of FIG. 4 showing arrangement of the quarter sphere reflectors each paired with a 2D display device.

FIG. 5 provides a side view of the display system 400 showing further detail of its components. From FIG. 5, the arrangement of the reflectors 422, 424, and 428 can be better appreciated. With reference to reflector 424, the components of each reflector can be understood. Particularly, the reflector 424 is quarter spherical in shape with a back side or surface 525 (non-reflecting surface) facing inward toward the central axis of the 3D display 420. The reflector 424 is open with an upper semi-circular edge 527 facing upward (or out of the 3D display 420) and in a plane parallel to the screen element 430. The reflector 424 also includes a front semi-circular edge 529 that is in a plane orthogonal to the screen element 430.

Significantly, the 3D display 420 further includes for each reflector 422-428 a 2D display device such as an LCD device that is operable to output light during its display operations that is directed toward the inner reflective surfaces of the reflector 422-428 to be reflected up or out through the screen element 430. This can be seen with exemplary 2D displays 530 and 532 paired, respectively, with reflectors 424 and 428. The display screens 531 and 533 of the 2D displays 530 and 532 face this inner reflective surface of the reflectors 424 and 428 with the display screens 531 and 533 each spaced apart a distance, $d_2$, from the front edge (e.g., edge 529 of reflector 424) that may range from about 1 to 12 inches or more (with a range of 3 to 6 inches working well for a 24-inch diameter reflector and no separation not being effective) to achieve a desired focal point for a displayed floating or hologram image above the screen element 430. The display screen 531 may be arranged to be parallel to the plane containing the front edge 529 or, more preferably, will be rotated away from the reflector 424 some angle greater than 90 degrees such as 95 to 105 degrees (or more) as 90 degrees (or parallel to the front edge 529) may not be effective in achieving a desired floating effect with many quarter sphere reflectors.

As shown in FIG. 5, the screen element 430 includes a layer or sheet of mesh fabric or woven netting 550 such as a scrim that is laminated to or otherwise joined with a transparent pane or panel 560. The screen element 430 may be arranged such that the layer/sheet (e.g., scrim) 550 is positioned proximate to or abutting the upper edges (such as edge 527) of the reflectors 422-428 with an inner or back surface 551 facing the 3D display 420 and an outer or front surface 552, which may be digitally printed or otherwise fabricated to have a desired color and/or pattern, facing away from the 3D display 420 (or toward the viewing space). In the illustrated arrangement, the transparent pane or panel 560 includes an inner or back surface 561 facing the 3D display 420 upon which the scrim 550 is attached and an outer or front surface 562 facing the viewing space or away from the 3D display 420. The scrim 550 may be abutting the upper edges (such as edge 527) of the reflectors 422-428 or in some embodiments be spaced apart a distance (d in FIG. 1) from these reflectors 422-428 to position the visual reference plane provided by the scrim 550 some distance apart from the upper edges of the reflectors 422-428 to achieve a desired effect.

The specific dimensions of the 3D display 420 and its components and the screen element 430 (which is sized to cover completely the output portions of the 3D display 420) may vary from very small for a toy or handheld version of the system 400 to very large for a tabletop display device suited for a large viewing space. In one tabletop display device, the system 400 was constructed with 24-inch diameter quarter sphere reflectors 422-428 and had the dimensions shown in FIG. 5 of $L_1$=64 inches, $L_2$=100 inches, $H_1$=36 inches, and $H_2$=12 inches. Of course, other dimensions may be useful with different sizes of reflectors and with differing numbers of reflectors (such as in embodiments that use less than 4 reflectors such as 1, 2, or 3 reflectors with a 90-degree, 180-degree, and 270-degree viewing angle rather than a 360-degree playable hologram as with system 400).

Figure 6:
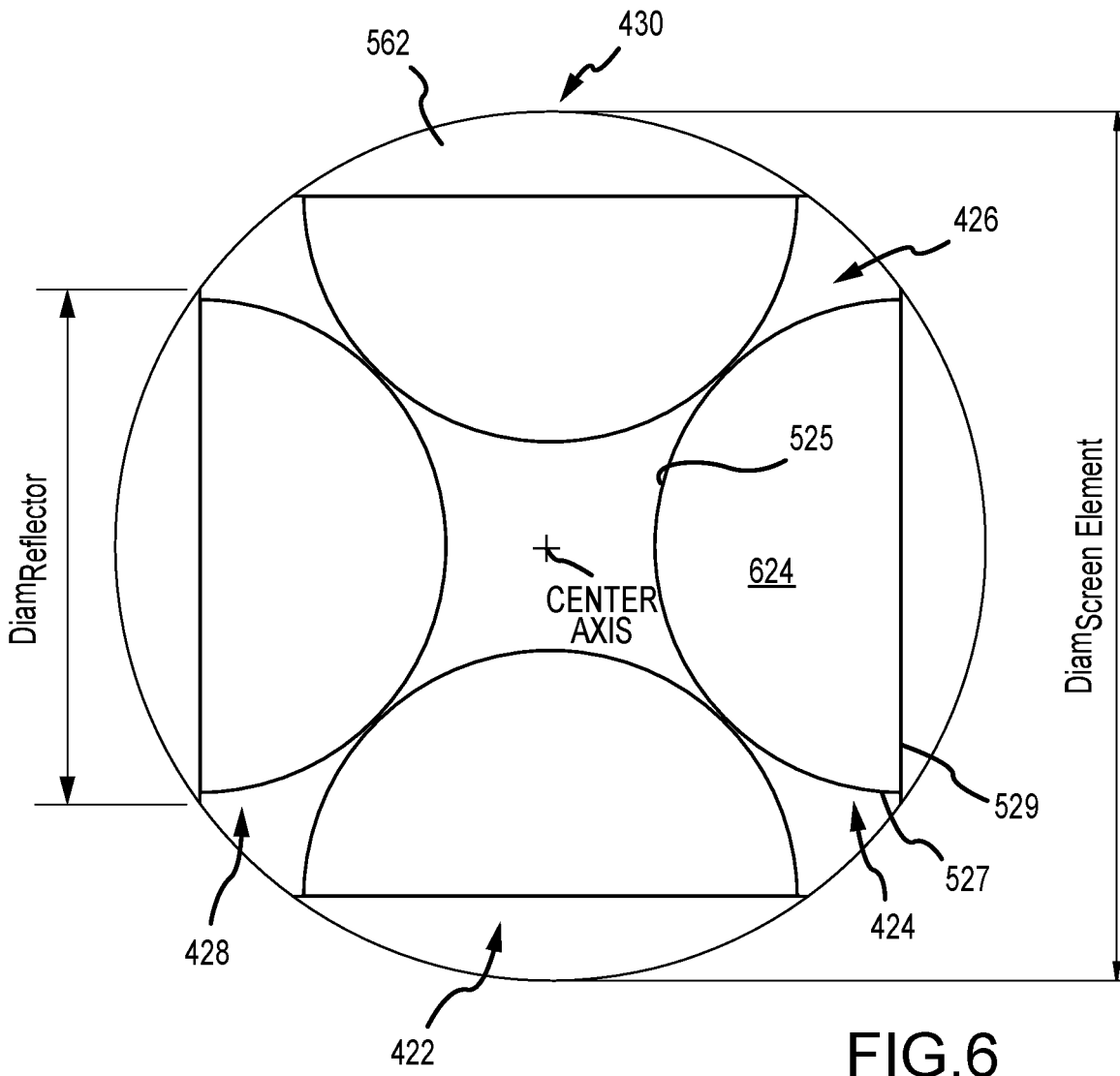
FIG. 6 is a partial top view of the display system of FIGS. 4 and 5 showing further details of the arrangement of the four quarter sphere reflectors in the 3D display.

FIG. 6 illustrates a partial top view of the system 400 showing the arrangement of the four quarter sphere reflectors 422, 424, 426, 428 relative to each other and to the center or central axis of the 3D display 420. From this top view, the four reflectors 422-428 can be seen to be arranged or nested within a circle defined by the outer edge of the screen element 430 having a center at the center axis shown with their front edge (such as front edge 529 of reflector 424) facing outward toward the circumference of this circle and a 2D display (not shown) positioned outside the circle. Each reflector has a diameter, $Diam_{Reflector}$, and the 2D display will be sized typically to have a width and a height that are both less than this diameter, $Diam_{Reflector}$. The diameter, $Diam_{Screen\ Element}$, can vary to practice the display system 400 but with 24-inch diameter reflectors is 63.39 inches in one prototype with the reflectors 422-428 arranged symmetrically about the center axis, with their top or upper edges in a single plane, and with their back surfaces/sides (as seen with surface 525 of reflector 424) facing the center axis of the 3D display 420. Further, the top or upper edges of the reflectors may optionally be placed in abutting contact with at one point with each of the neighboring pair of the reflectors 422-428 (e.g., reflector 424, as shown in FIG. 6, abuts both reflector 422 and 428 with its upper edge 527 contacting their upper edges).

As shown, the reflective inner surface or side of each of the four quarter spherical reflectors 422-428 faces up (or out) of the 3D display such that they are visible through the upper surface 562 of the transparent pane/panel of the screen element 430. For example, the reflective inner surface 624 of the reflector 424 is fully exposed to and facing the screen element 430 such that a viewer looking down into the display system or observing the system while walking around its periphery would observe light reflected from the surface 624 after it passes through the screen element 430. Typically, the light from a 2D display would be reflected generally orthogonally to the screen element 430 by the reflective inner surface 624.

Figure 7:
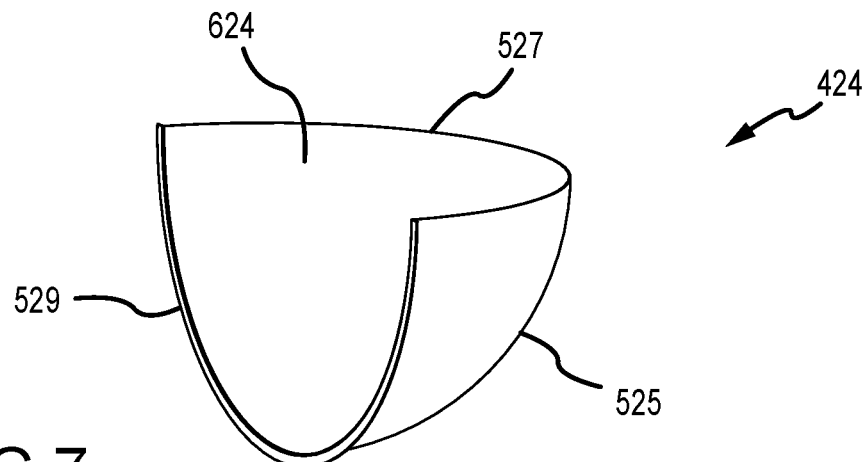
FIG. 7 illustrates a side perspective of a single quarter sphere reflector as may be used in the systems of FIGS. 4-6.

FIG. 7 illustrates one of the reflectors 424 in isolation. The reflector 424 can be seen to be a quarter of a hollow sphere formed from a thin layer of a rigid material such as a plastic, a glass, a ceramic, or the like. The reflector 424 includes a back surface or side 525 and is defined by an upper (or outer) edge 527 and a front (or side) edge 529. These features define an inner reflective surface 624 that has a quarter sphere (or quarter spherical) shape. This surface 624 is reflective, which can be achieved through the selection of the material such as by using a black plastic and/or through treatment of the surface 624 or surface 525 such as by painting either of these surfaces 525, 624 with black or other color paint (or finishing materials). In some embodiments, a mirror-type material is applied to one of these two surfaces, but the inventors determined that use of a black material or black surface often works better than a mirrored one in providing the quarter sphere reflectors 422-428.

Figure 8:
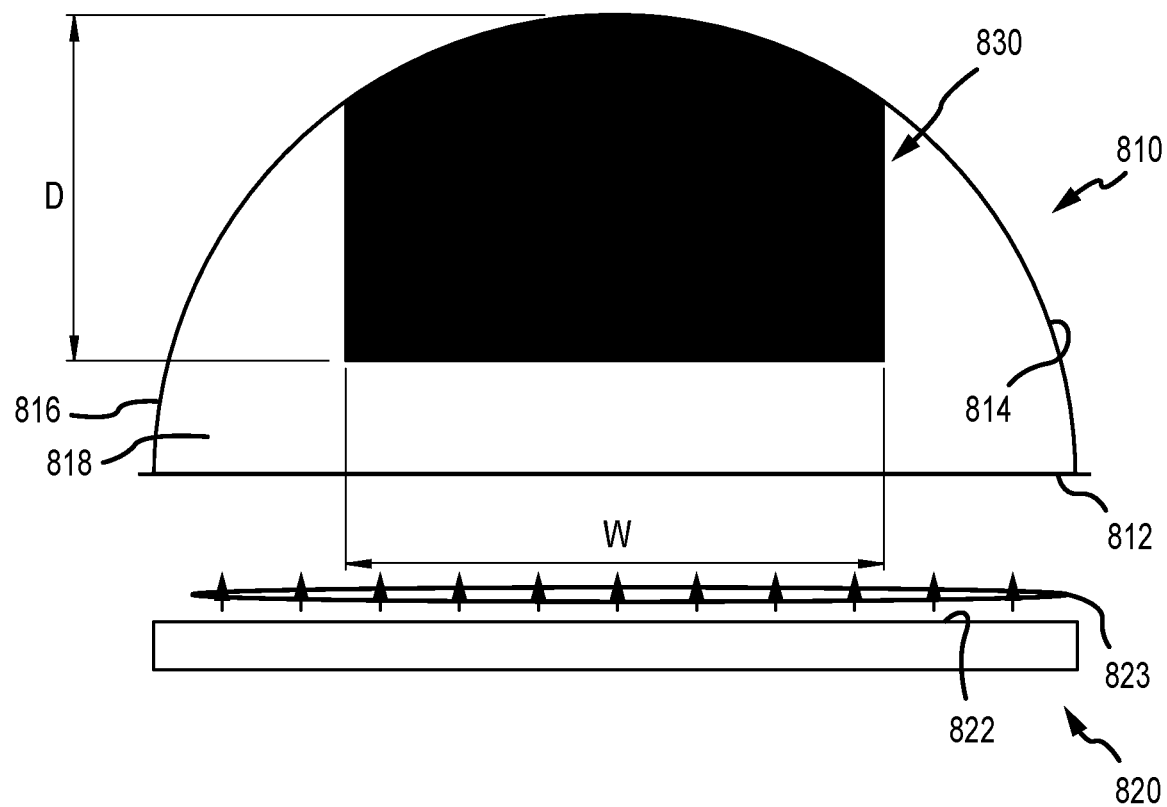
FIG. 8 is a top view of a single reflector-2D display pair of a 3D display that may be used in the display systems of FIGS. 4-6.

FIG. 8 illustrates a quarter sphere reflector 810 paired with a 2D display device 820 (such as an LCD device or the like). The reflector 810 includes a front edge 812, a back surface or side 814, a top edge 816, and an inner reflective surface 818. The display screen 822 of the 2D display device 820 is spaced apart a distance (d2 from prior figures) from the front edge 812 of the reflector 810 and is selectively operated as shown to display a 2D image such that light 823 from the display screen 822 is directed into the reflector 810 and onto reflective surface 818. As discussed above, each 2D display 820 is controlled to display 2D media that presents a different side or view of the viewed 3D or floating image and when combined—such as in FIGS. 4-6—four (or as many 2D display-reflector pairs as included) sides or view points of an image can be provided (e.g., opposite 2D display-reflector pairs in a 3D display would show opposite sides of the displayed image such as the front and back of a character's image or the like) which may be taken by a camera positioned at 90-degree offsets.

Testing by the inventors has shown that the resulting floating image is not typically provided by or matching the surface area of the reflective surface 818 but is, instead, a smaller subset as shown with image area 830. The image area 830 is generally rectangular in shape with a semispherical portion adjacent the most inner portion of the reflective surface 818. The image area 830 has a depth, D, and a width, W, that will vary with the size of the dome/reflector quarter sphere reflector 810 assuming a 2D display with a screen larger than the image area 830. Testing and analysis has shown the following: (1) a 24-inch diameter hemisphere/dome produces an image area with D=9 inches and W=14 inches; (2) a 32-inch diameter hemisphere/dome produces an image area with D=12 inches and W=18.67 inches; (3) a 36-inch diameter hemisphere/dome produces an image area with D=13.5 inches and W=21 inches; and (4) a 48-inch diameter hemisphere/dome produces an image area with D=18 inches and W=28 inches. With this size and location in mind for the image area, the scrim can be printed to enhance the resulting floating image such as by being printed with bright colors where the effect takes place (i.e., where the 3D component in the media provided to the 2D display is provided within the image area 830). Visual cues can be printed or otherwise provided on the scrim to draw the viewer's eyes to the floating image/hologram.

Figure 9:
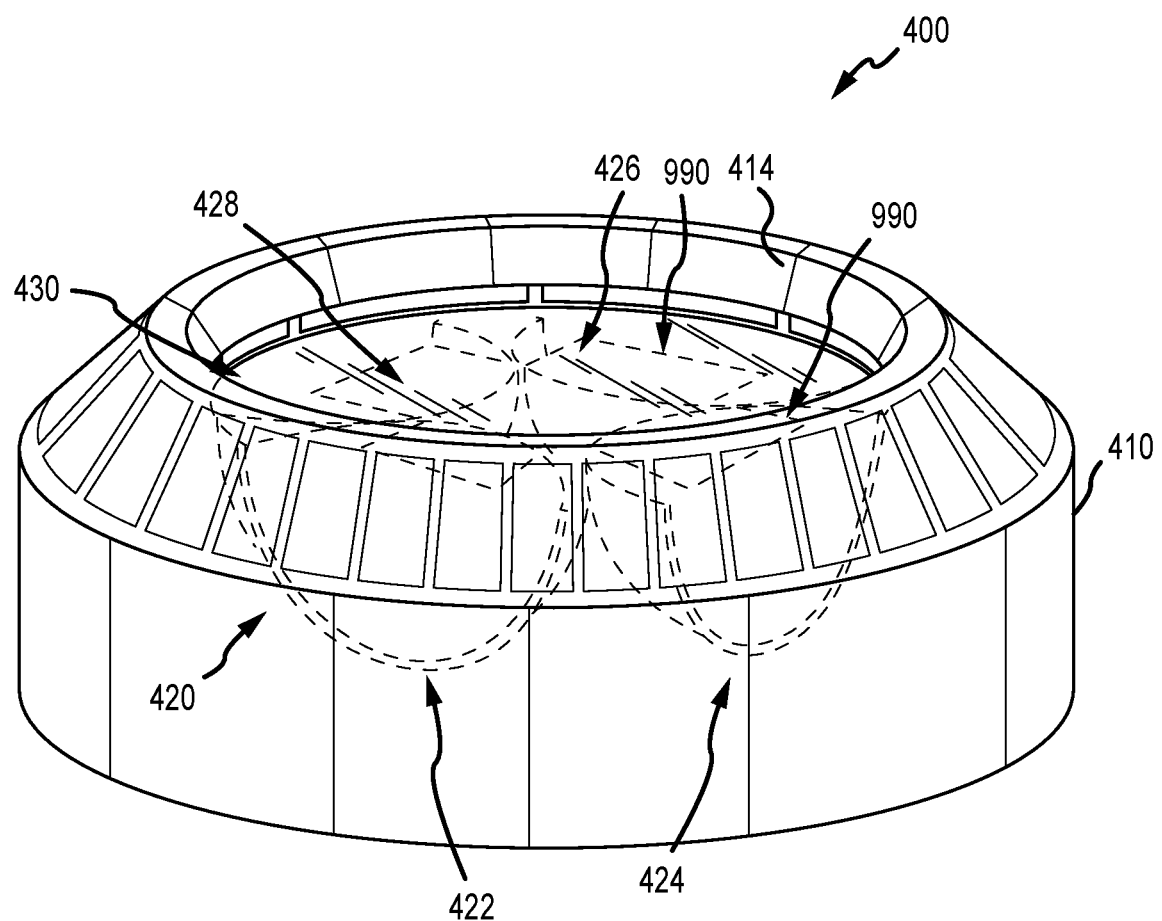
FIG. 9 is a top perspective view of a display system similar to that of FIG. 4 that further includes a set of direction micro louvers each positioned over one of the quarter sphere reflectors to control when its reflections are viewable by viewers.

FIG. 9 illustrates the display system 400 of FIG. 4 with a modification to include four micro louver elements 990, which are formed of directional micro louver material (e.g., privacy screen material produced by 3M or the like). These are shaped and sized to match the image areas 830 shown in FIG. 8 for a particular reflector, and each micro louver element 990 is positioned above one of the reflectors 422-428 where the reflected light from the 2D display would pass through the screen element 430. Each micro louver element 990 is configured to allow the light from the reflector 422-428 it is associated with to be viewed across a 90-degree viewing window while not seeing light from the other three reflectors (with the center of this 90-degree viewing window extending orthogonally outward from the front edge of the particular reflector 422, 424, 426, or 428).

Figure 10:
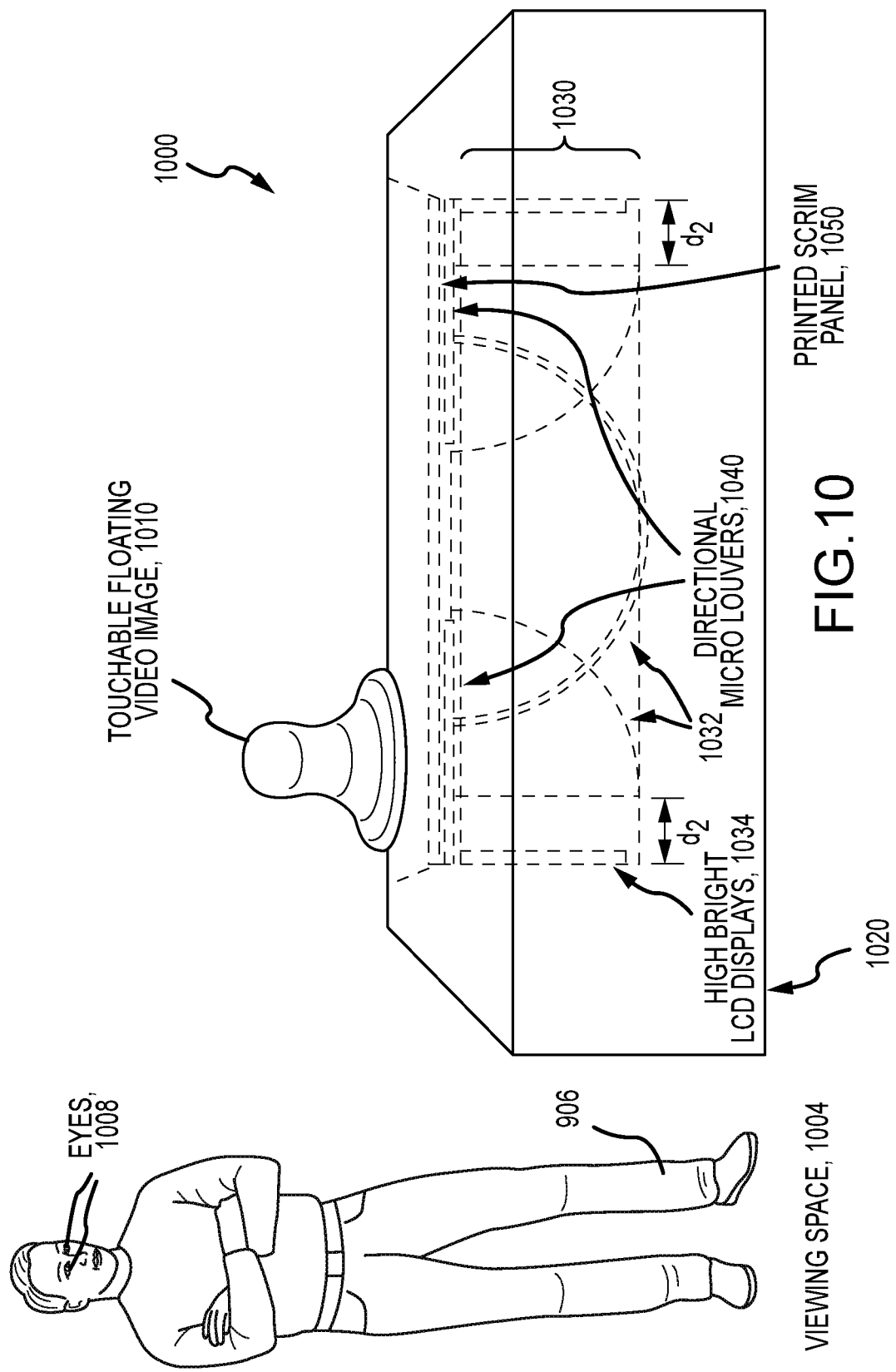
FIG. 10 is a side view of another implementation of a tabletop display system of the present description with the supporting or table enclosure shown transparent to provide additional details of components of a 3D display and a screen element in the display system.

FIG. 10 illustrates a display system 1000 with a tabletop support or enclosure 1020 shown to be transparent to allow viewing of the components of the system 1000. The system 1000 includes a viewing space 1004 about the support/enclosure 1020 in which a viewer 1006 is located and is perceiving a touchable, floating video image 1010 with their eyes 1008 (but without the need for special eyewear). To this end, a 3D display 1030 is provided in the interior space of the support/enclosure 1020 that includes four quarter sphere reflectors 1032, which may be arranged and configured as discussed above.

Further, the 3D display 1030 includes a like number of high brightness LCD displays (or other 2D displays) 1034 that are each paired with one of the reflectors 1032 and, typically, with their display screens spaced apart a distance, $d_2$, from a front edge of the paired reflector 1032 and rotated at an angle of 91 to 105 or more degrees (from the plane containing the front edge of the nearby reflector so not parallel to this spaced apart plane)). High brightness displays 1034 may be desirable because of light losses in the display system 1000. First, the reflectors 1032 may utilize black-painted surfaces or black-colored materials rather than mirrored surfaces that can result in some light loss during reflection. Second, the use of the louvers 1040 and scrim or other material in the screen element 1050 can further cause light loss. Hence, this loss of brightness in the image 1010 may make it desirable to use a higher brightness 2D display for displays 1034, and, in one prototype, the inventors utilized specially-made 3000 Nit, HD resolution, 24-inch LCDs for displays 1034.

Over each reflector 1032 is provided a directional micro louver 1040 configured to allow a viewer 1006 facing one of the reflectors 1032 (or within the 90-degree viewing window discussed above) to view the image 1010 produced by that reflector 1032 while not being able to discern light from other reflectors 1032. The micro louvers 1040 may be planar and placed on or adjacent and parallel to the upper or top edges of the reflectors 1032 (or to a plane containing the upper or top edges) so as to be sandwiched between the reflectors 1032 and the screen element 1050.

The screen element 1050 may take the form of a printed scrim with a designed pattern and colors as discussed above that is applied to an inner (or outer) surface of a pane or sheet of translucent-to-transparent (with more or "fully" transparent preferred) material such as a sheet of glass or plastic. The screen element 1050 is generally sized and shaped to be able to wholly cover the reflective inner surfaces of the reflectors 1032 and may have nearly any shape such as circular or rectangular. The scrim panel 1050 may be placed in contact with the four micro louvers 1040 or may be spaced apart some distance to achieve a desired location for the scrim (or other mesh or woven netting material) relative to the reflectors 1032.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For instance, the above description includes implementations in which the screen element includes a sheet of mesh or netting material, and the sheet of mesh or woven netting material transmits a portion of the light output by a 3D display (e.g., a lenticular-based device, a 3D LCD, and the like) through pores or openings in the mesh or netting material. In specific cases, the sheet of mesh or netting material was provided with a sheet of scrim or tulle, which may optionally be arranged to be parallel to the display's output screen. This sheet may be a "chiffon" configured to provide a high-resolution printable scrim surface, and this printable scrim surface may have great front opacity (when not backlit reflecting ambient light striking its front/exterior printed surface) while providing backlit transparency (when backlit by light from the 3D display, for example). This is useful for both close up magical display effects as well as large scale, distance-based illusions. The screen element, including the chiffon implementations, may be laminated or adhered to glass or plastic substrates to make it a hard and rigid (often planar or curved) surface.

We claim:

1. A system for displaying three dimensional (3D) floating images to viewers, comprising:
    a backlit 3D display operating in a first state to display a non-holographic 3D image by outputting light into a viewing space and operating in a second state in which the 3D image is not displayed; and
    a screen element positioned between the 3D display and the viewing space,
    wherein the screen element reflects light from the viewing space to appear opaque to a viewer in the viewing space when the 3D display operates in the second state,
    wherein the screen element transmits at least a portion of the light output by the 3D display when the 3D display operates in the first state,
    wherein the 3D image is perceivable by the viewer in the viewing space between the screen element and a location of the viewer at a distance apart from the screen element,
    wherein the screen element comprises a sheet of mesh or netting material,
    wherein the sheet of mesh or woven netting material transmits the at least a portion of the light output by the 3D display through pores or openings in the mesh or netting material,
    wherein the screen element further comprises a panel or pane of transparent material with an inner surface facing the 3D display and an outer surface facing the viewing space, and
    wherein the sheet of mesh or woven netting material is mated to the inner surface of the panel or pane of transparent material.

2. The system of claim 1, wherein the sheet of mesh or netting material comprises a planar sheet of scrim, tulle, or chiffon.

3. The system of claim 1, wherein the 3D display comprises an autostereoscopic display device.

4. The system of claim 3, wherein the autostereoscopic display device comprises a 3D television with a display screen facing the screen element.

5. The system of claim 4, wherein the 3D display further comprises a controller and a media server, wherein the controller operates the media server to serve media to the 3D television during the first operating state, wherein the media comprises a colored 3D component and a black background in areas unused by the colored 3D component, and wherein, when the 3D image is displayed on the 3D display, the colored 3D component shines through the screen element and the areas unused by the colored 3D component do not shine through the screen element.

6. The system of claim 1, wherein the system has a depth of a few inches as measured from a back side of the backlit 3D display to a front side of the screen element.

7. A system for displaying three dimensional (3D) floating images to viewers, comprising:
 a stereoscopic display operable to display a 3D image by outputting light comprising alternating left and right eye images; and
 a screen element positioned between the stereoscopic display and a viewing space,
 wherein the screen element reflects light from the viewing space and transmits at least a portion of the light output by the stereoscopic display, whereby the 3D display image is perceivable by the viewer in the viewing space at a distance apart from the screen element,
 wherein the screen element comprises a layer of mesh or woven netting material,
 wherein the layer of mesh or woven netting material comprises a layer scrim, tulle, or chiffon material,
 wherein the screen element further comprises a panel or pane of transparent material with an inner surface facing the stereoscopic display and an outer surface facing the viewing space, and
 wherein the layer of mesh or woven netting material is mated to the inner surface of the panel or pane of transparent material so as to be disposed between the stereoscopic display and the panel or pane of transparent material.

8. The system of claim 7, wherein the stereoscopic display comprises an autostereoscopic display device.

9. The system of claim 8, wherein the autostereoscopic display device comprises a 3D television with a display screen facing the screen element.

10. The system of claim 9, wherein the displayed 3D image comprises media including a colored 3D component and a black background in areas unused by the colored 3D component.

11. A system for displaying three dimensional (3D) floating images to viewers, comprising:
 a backlit 3D display operating in a first state to display a non-holographic 3D image by outputting light into a viewing space and operating in a second state in which the 3D image is not displayed; and
 a screen element positioned between the 3D display and the viewing space,
 wherein the screen element reflects light from the viewing space to appear opaque to a viewer in the viewing space when the 3D display operates in the second state,
 wherein the screen element transmits at least a portion of the light output by the 3D display when the 3D display operates in the first state,
 wherein the 3D image is perceivable by the viewer in the viewing space between the screen element and a location of the viewer at a distance apart from the screen element,
 wherein the 3D display comprises an autostereoscopic display device that comprises a 3D television with a display screen facing the screen element, and
 wherein the 3D display further comprises a controller and a media server, wherein the controller operates the media server to serve media to the 3D television during the first operating state, wherein the media comprises a colored 3D component and a black background in areas unused by the colored 3D component, and wherein, when the 3D image is displayed on the 3D display, the colored 3D component shines through the screen element and the areas unused by the colored 3D component do not shine through the screen element.

12. The system of claim 11, wherein the screen element comprises a sheet of mesh or netting material and wherein the sheet of mesh or woven netting material transmits the at least a portion of the light output by the 3D display through pores or openings in the mesh or netting material.

13. The system of claim 12, wherein the sheet of mesh or netting material comprises a planar sheet of scrim, tulle, or chiffon.

14. The system of claim 11, wherein the system has a depth of a few inches as measured from a back side of the backlit 3D display to a front side of the screen element.

* * * * *